2 Sheets—Sheet 1

N. M. MENDENHALL,

Assignor to GAAR, SCOTT & Co.

TRACTION ENGINE.

No. 9,819. Reissued July 26, 1881.

Witnesses.

Jas. E. Hutchinson.

J. A. Rutherford

Inventor.

Nathan M. Mendenhall, by James L. Norris. Atty.

2 Sheets—Sheet 2.

N. M. MENDENHALL,

Assignor to GAAR, SCOTT & Co.

TRACTION ENGINE.

No. 9,819. Reissued July 26, 1881

Witnesses.

Jas. E. Hutchinson.

J. A. Rutherford

Inventor

Nathan M. Mendenhall, by James L. Norris.

Atty.

UNITED STATES PATENT OFFICE.

NATHAN M. MENDENHALL, OF SPICELAND, ASSIGNOR TO GAAR, SCOTT & CO., OF RICHMOND, INDIANA.

TRACTION-ENGINE.

SPECIFICATION forming part of Reissued Letters Patent No. 9,819, dated July 26, 1881

Original No. 144,467, dated November 11, 1873. Application for reissue filed March 11, 1881.

*To all whom it may concern:*

Be it known that I, NATHAN M. MENDENHALL, a citizen of the United States, residing at Spiceland, in the county of Henry and State of Indiana, have invented certain new and useful Improvements in Traction-Engines, of which the following is a specification.

The present invention relates to improvements in that class of engines which are specially adapted for agricultural purposes, such as drawing plows, wagons, &c., and which, when at rest, can be used for driving thrashing, sawing, and other machinery.

The chief object of the invention is to furnish means for permitting differential movement of the traction-wheels, as is required, for instance, when the engine turns a corner or travels in a curved path, in which case one wheel should travel faster than the other.

Another object of the invention is to cause the traction-wheels to revolve at a uniform rate of speed when traveling on straight roads, and to permit either one of the wheels to be maintained at a state of rest for making short turns of the engine, and, furthermore, to permit both traction-wheels to be stopped without discontinuing the motion of the engine.

The invention consists in the construction and combination of parts, which will be hereinafter more fully described, and then set forth in the claims.

Figure 1:
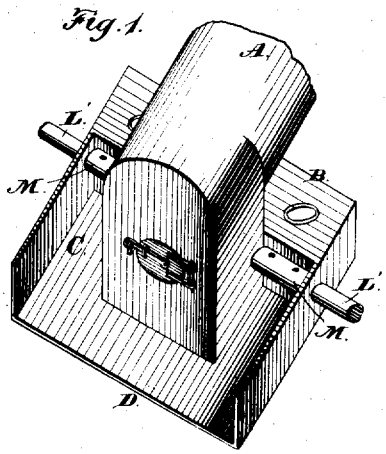
Figure 2:
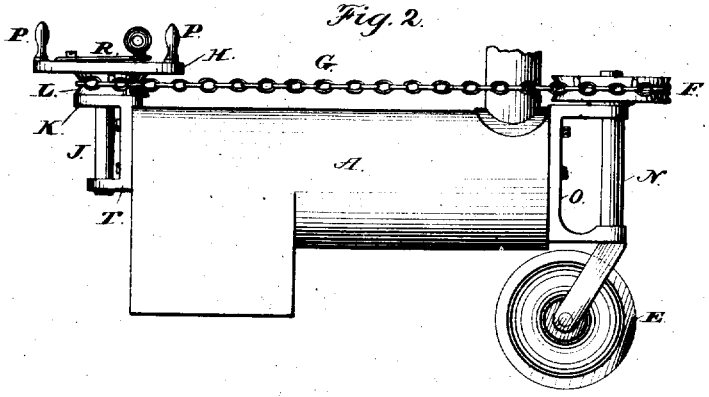
Figure 3:
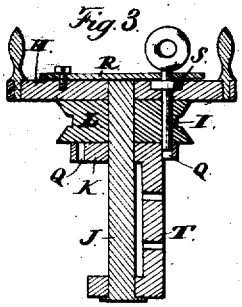
Figure 4:
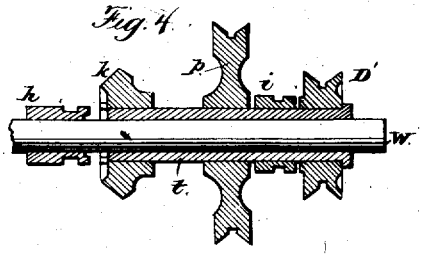
Figure 5:
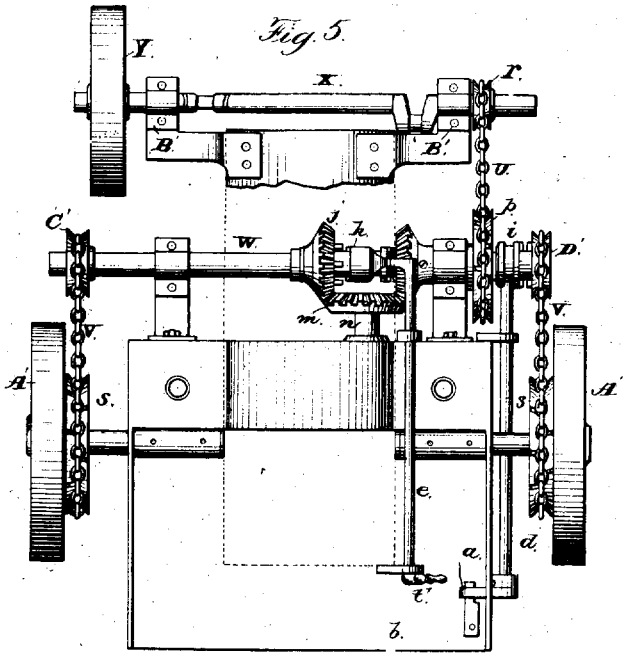

In the drawings, Figure 1 is a perspective view of the boiler, tanks, fuel-boxes, and axle-bearings of the traction-wheels. Fig. 2 is a side elevation, exhibiting the steering mechanism and boiler. Fig. 3 is a vertical section of the means for adjusting and locking the steering or caster wheel. Fig. 4 is a longitudinal section of the counter-shaft, which carries the devices for connecting the engine or main driving-shaft with the independent truck or traction wheels. Fig. 5 is a plan or top view, with the rear part of the boiler cut away to show the driving mechanism.

The letter A designates a suitable steam-boiler, having the water-tank B, fuel-boxes C, and engineer's platform D arranged in proper relation thereto. These parts are supported by the traction or truck wheels A′, and the front caster-wheel, E, which is attached to the vertical shaft N, having its bearings in a bracket or support O attached to the front end of the boiler. A grooved pulley or sheave, F, secured to the upper end of the shaft N, receives an endless chain, G, which extends in a rearward direction and passes around a grooved horizontal pulley or chain sheave, L, secured to the upper end of a shaft, J. This shaft has its bearings in a bracket or support, T, on the rear end of the boiler. A circular plate or disk, K, attached to the upper end of the bracket T, has a series of holes, Q, formed therein around its outer edge. A pin or stud, I, passing through the pulley or chain sheave L, will, when projected into any one of these openings, prevent said sheave from turning, and consequently also hold the caster-wheel E in a stationary position. The pin or stud I is provided with an enlargement or head, S, (shown in Fig. 3,) and with a neck and loop above said head. A plate-spring, R, bearing upon or secured to said head S, is attached to a lever or hand-wheel, H, applied to the upper end of the shaft J. A slot or groove cut in the upper face of said lever H serves to receive the elongated head or enlargement of the pin I, when the same is properly turned to cause said head to be forced into said groove by the spring R. When the pin is in this position it serves to lock the pulley or sheave L, so as to maintain the caster-wheel in a stationary position.

When it is desired to steer or turn the engine by means of the caster-wheel and endless chain or belt, the pin or stud I is raised and the head thereof turned across the receiving-slot in the lever H. This will disengage the lower end of the pin I from the plate or disk K, so as to cause the two pulleys and chain or belt to play around freely and adjust themselves; or the steering devices may be controlled by the engineer through the medium of the handles P of the lever H. When the caster-wheel is again required to be held stationary the pin or stud I is turned until its head or enlargement S drops into the slot in the lever H, where it is held by the spring R.

The driving or traction wheels A′ are securely attached to short independent axles L′, which have their bearings in boxes M, attached to or extending through the fuel-boxes. This arrangement of the traction-wheels will allow one wheel to move forward and the other backward at the same time when it is desired to make a short turn; and, furthermore, a differential movement of the traction-wheels is permitted, or, in other words, one wheel is permitted to travel faster than the other when the engine turns a corner or travels in a curved path. When the caster-wheel is unlocked or allowed free play it adjusts itself to the circle or curved path that is being made by the machine. It will thus be apparent that there are three points upon which the whole machine turns—viz., the two traction-wheels and the front caster-wheel. If it is desired to turn to the left, the left traction-wheel is stopped or prevented from moving, while the caster-wheel is allowed free play, whereupon when the right wheel is put in motion the machine is turned to the left, the wheel at that side being the pivot or center upon which the entire machine turns. In order to turn the machine to the right the operation is reversed.

I preferably use double steam-engines—that is, steam-cylinders with their pistons and other adjustments—and dispense with a fly-wheel, which allows the engine to be stopped quickly when it is used for locomotive or hauling purposes.

When the engine is used for stationary purposes, or when at rest, a band-pulley, Y, is attached to the double-crank shaft X, which receives motion from the double engines above referred to, and is journaled in bearings or boxes B′ attached to the front end of the boiler. A grooved pulley or sheave, *r*, keyed to the crank-shaft serves to communicate motion to the counter-shaft W through the medium of the chain or belt U. Said counter-shaft extends transversely across the machine, and has fitted thereon a sleeve, *t*, to which is secured a pulley or sheave, *p*, for receiving the chain or belt U. The grooved pulleys or sheaves C′ D′ on the counter-shaft W receive endless chains or belts V, which pass around pulleys or sheaves *s* keyed or secured to the shafts of the traction-wheels.

The operation of an engine embodying my improvements may be further described in the following manner, viz:

The engineer having control of the engine stands upon the platform D, within easy reach of the operating devices. In order to turn the machine to the left, the pin or stud I is disengaged from the hole in the plate K, giving the caster-wheel free play. The left driving or traction wheel is then stopped by shifting the clutch *h* on the counter-shaft or throwing it out of gear with the bevel-gear wheel *j*. This shifting of the clutch *h* is effected by the longitudinal rock-shaft or shifting-lever *e*, having a handle, *l*′. The left wheel having been disconnected from the driving-engine, the motion of the latter is continued so as to rotate or turn the right wheel and cause the engine to turn on the left wheel as a pivot or center. The clutch *h* is connected with the counter-shaft W by a spline and feather, and has clutch-teeth on both ends, so as to engage either with the bevel-gear wheel *j* on the shaft W or the bevel-gear wheel *k* on the sleeve *t* encircling said shaft.

In order to turn the machine to the right, the clutch *i*, fitted on the sleeve *t*, is disengaged from the chain-sheave or pulley D′, thus arresting the motion of the right, while allowing the wheel on the left to turn, and consequently causing the machine to turn to the right. The clutch *i* is shifted by depressing an arm, *a*, of the lever or rock-shaft *d* connected with said clutch. When the foot is removed from said arm *a* a spring, *b*, located thereunder, throws the lever *d* and replaces the clutch *i* in gear with the pulley D′, so as to cause the machine to move onward, as before.

In order to make a very short turn with the engine, the clutch *h* is caused to engage with the wheel *j* on the counter-shaft, thus disengaging the sleeve *t* from said shaft and causing it to turn independently thereof. This sleeve is provided with a bevel-gear wheel, *k*, which, through the intervention of an intermediate bevel-gear wheel, *m*, fitted on a short longitudinal axis, *n*, serves to give motion to the counter-shaft W, or to the bevel-gear wheel *j*, keyed thereto by the clutch *h*. It will thus be perceived that one driving-wheel is caused to move backward and the other forward, according to the direction in which the turn is to be made, and the center upon which the engine turns is transferred to the middle of the boiler between the driving-wheels. The engine can thus be made to turn in a smaller space than the length thereof, which is very desirable in plowing and other purposes for which the engine may be used. By disengaging both clutches the traction-wheels are stopped without discontinuing the motion of the engine.

I do not confine myself to the construction above described, as many modifications thereof may be made. For example, in place of the several chains or belts I may use spur-wheels or other gearing, and instead of a single transverse counter-shaft, bevel gearing, sleeve, and clutches, I may employ a counter-shaft made in two pieces hung in suitable boxes so as to be readily shifted.

An engine constructed according to the present invention is adapted for agricultural purposes in general, and may be used either as a portable or stationary engine for plowing or traveling on common roads and driving thrashing, sawing, or other machinery.

What I claim is—

1. In a traction-engine, the combination, with two independent traction-wheels, each provided with a main gear-wheel or pulley, of a counter-shaft extending transversely across the engine-frame, and having at its ends respectively a fast and a loose gear-wheel or pulley in gear with the main gear-wheels or pulleys of the traction-wheels, a crank-shaft driven by the engine, and intermediate controllable connecting devices between the said crank-shaft and the loose gear-wheel on the counter-shaft, whereby said loose gear-wheel can be thrown into and out of gear with the gear-wheel or pulley of the traction-wheel, substantially as described.

2. In a traction-engine, the combination, with independent truck or traction wheels, each provided with a main gear-wheel or pulley, of a counter-shaft extending continuously across the engine-frame, and having at one end a fast gear-wheel or pulley in gear with the gear-wheel or pulley of one truck or traction wheel, and at its other end a loose gear-wheel or pulley in gear with the gear-wheel or pulley of the other truck or traction wheel, and a gear-wheel or pulley driven from the crank-shaft of the engine and arranged to connect with or release the loose pulley on the counter-shaft, substantially as described.

3. In a traction-engine, the combination of independent traction-wheels, each provided with a main gear-wheel or pulley, a counter-shaft extending transversely across the engine-frame, and having at its ends respectively a fast and loose gear-wheel or pulley in gear with the respective gear-wheels or pulleys of the traction-wheels, a transverse crank-shaft driven from the engine, and a controllable device between the crank-shaft of the engine and the loose pulley on the counter-shaft, whereby the latter may be released or driven at the will of the operator, substantially as described.

4. In a traction-engine, the combination of independent traction-wheels arranged outside the engine-frame, and each provided with a main gear-wheel or pulley, a counter-shaft extending continuously across the engine-frame, and its ends provided respectively with a fast and a loose gear-wheel or pulley in gear with the respective traction-wheels, a transverse crank-shaft driven by the engine, and a gear-wheel or pinion driven by the said crank-shaft and adapted to be thrown into and out of gear with the loose gear-wheel or pulley on the counter-shaft, substantially as and for the purpose described.

5. In a traction-engine, the combination of independent traction-wheels, each provided with a main gear-wheel or pulley, a counter-shaft extending continuously across the engine-frame, and provided at its extreme ends respectively with a fast and a loose gear-wheel or pulley, chains or belts connecting said fast and loose gear-wheels or pulleys with the gear-wheels or pulleys of the traction-wheels, a crank-shaft driven by the engine and in gear with the counter-shaft, and a controllable device between the crank-shaft and the loose pulley on the crank-shaft, substantially as and for the purpose described.

6. In a traction or portable engine, the combination of the counter-shaft W, bevel-wheels *j k m*, sleeve *t*, clutches *h* and *i*, pulleys *s s*, traction-wheels A′ A′, pulley C′ on the counter-shaft W, pulley D′ on the sleeve, and the chains or belts V V, substantially as set forth.

7. The sleeve *t*, having the bevel-wheel *k*, grooved pulley *p*, clutch *i*, and grooved pulley D′, in combination with the counter-shaft W, grooved pulley on the engine-shaft X, and the pulley *s* on the traction-wheel shaft L, substantially as set forth.

8. The combination of the foot-lever *a*, spring *b*, and rocking lever *d* with the clutch *i* and grooved pulley D′, whereby the traction-wheel may be stopped and started at will.

9. The combination of the grooved pulleys L′ and F, endless chain or belt G, circular plate K, lever H, pin or stud I, spring R, and caster-wheel E, whereby said wheel may be guided or held stationary at will, as and for the purpose set forth.

In testimony whereof I have hereunto set my hand in the presence of two witnesses.

NATHAN M. MENDENHALL.

Witnesses:

FLEMING RATCLIFF,

NATHAN T. NIXON.